MODULATOR USING FIELD-EFFECT TRANSISTORS

Filed March 31, 1966 3 Sheets-Sheet 1

United States Patent Office 3,397,353

Patented Aug. 13, 1968

3,397,353

MODULATORS USING FIELD-EFFECT TRANSISTORS

James J. Hitt, Willow Grove, and Gerald Mosley, Melrose Park, Pa., assignors to Leeds & Northrup Company, Philadelphia, Pa., a corporation of Pennsylvania Filed Mar. 31, 1966, Ser. No. 539,038
9 Claims. (Cl. 321—44)

ABSTRACT OF THE DISCLOSURE

Full-wave and half-wave modulator circuits of series-connected and shunt-connected types using field-effect transistors with balanced amplifier-coupling networks of RC and transformer types. In all of the modulator circuits disclosed, the means for minimizing transfer to the amplifier of switching transients includes an external capacitor connected between the gate of the field-effect transistor and one of its channel electrodes for balancing of the internal feed-through capacitances. In the shunt-connected modulator circuitry, the impedance of the signal source as seen by one-half of the balanced amplifier-coupling network is balanced by an impedance of like value as seen by the other half of the amplifier-coupling network: In the series-connected modulator circuitry, the impedance as respectively seen by the halves of the amplifier-coupling network may, in one circuit configuration, be balanced in similar manner or, in another circuit configuration, by shunting the signal source by capacitance of low impedance at the operating frequency.

This invention relates to modulators or choppers such such as used in various measuring systems, and particularly relates to chopper circuitry for conversion of low-level DC or slowly-varying AC signals to AC signals of higher frequency.

Modulators heretofore used for such purpose have been: of the mechanical vibrator type which requires relatively high driving power and is limited to low-frequency operation; of the photo-resistor type which is also frequency-limited and requires substantial driving power; and of the junction-transistor type which is poorly suited for high-impedance applications and requires rather complex circuitry for correction of offset errors.

In accordance with the present invention, low-level high-impedance modulators which have low drive requirements, extended range of operating frequency and negligible offset errors are provided by utilization of field-effect transistors in combination with balanced circuits, including capacitors for balancing of the feed-through capacitances of the transistors. In some modifications, the balanced circuitry includes amplifier-coupling transformers having specially wound primary windings.

The invention further resides in field-effect modulator circuitry having features of combination and arrangement hereinafter described and claimed.

Figure 1:
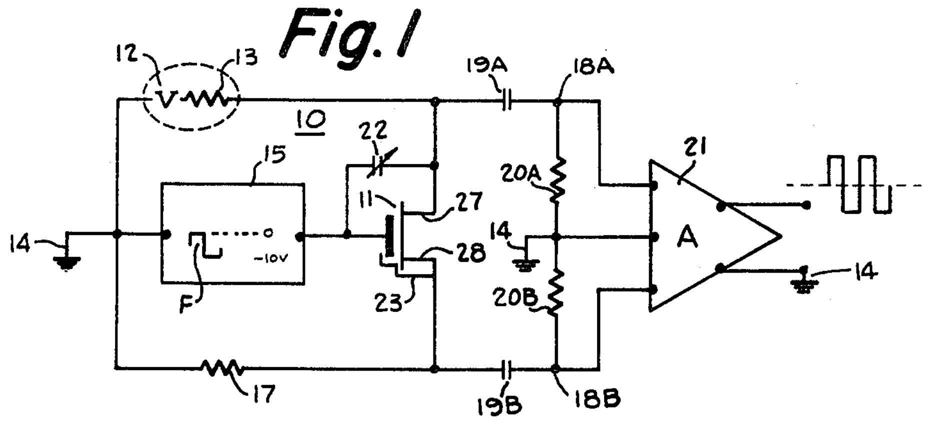
Figure 2:
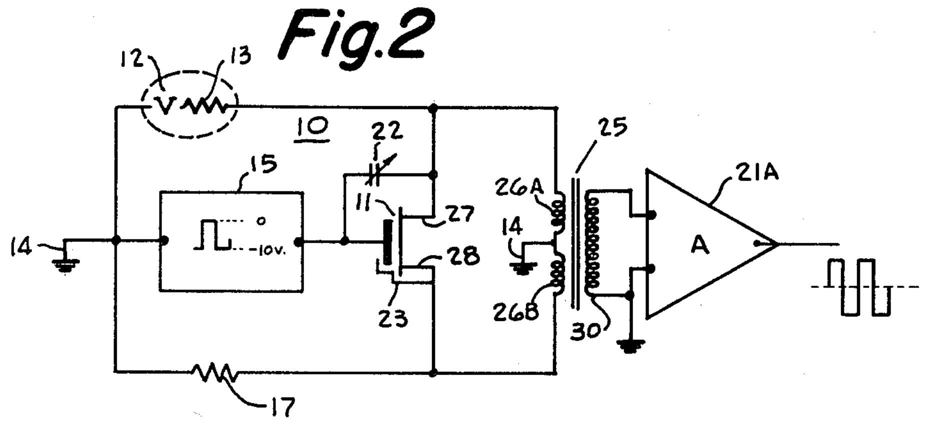
Figure 5:
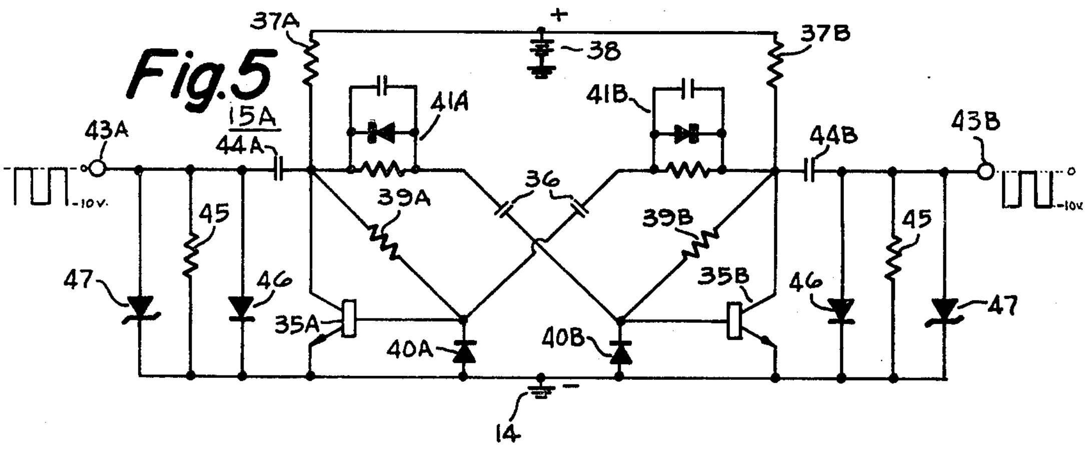
Figure 3A:
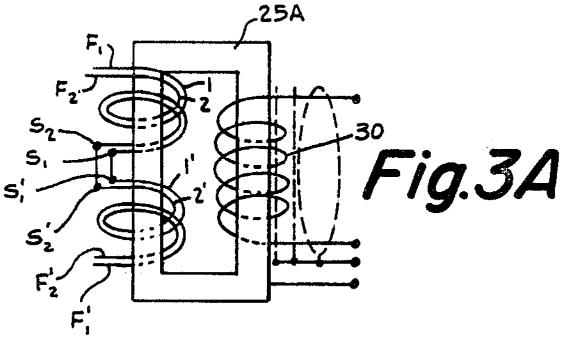
Figure 3B:
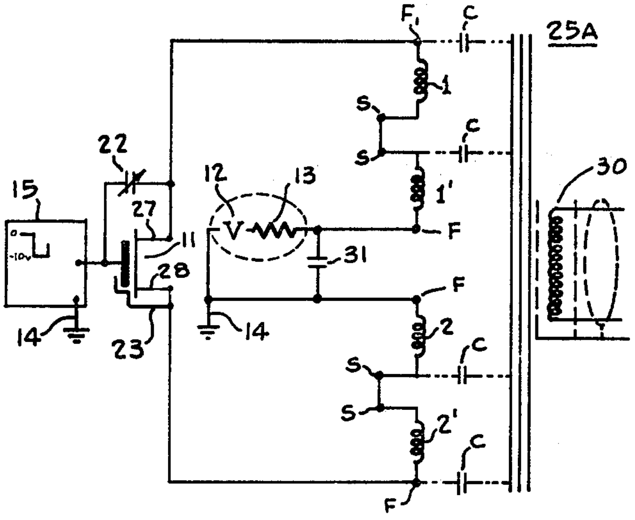
Figure 3C:
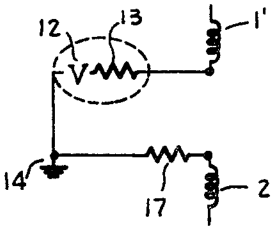
Figure 4A:
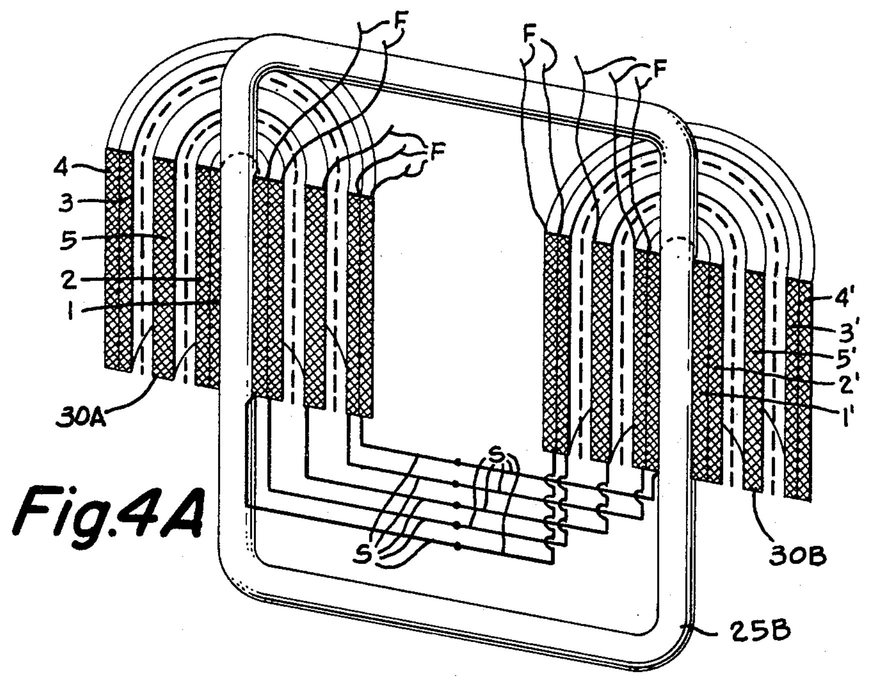
Figure 4B:
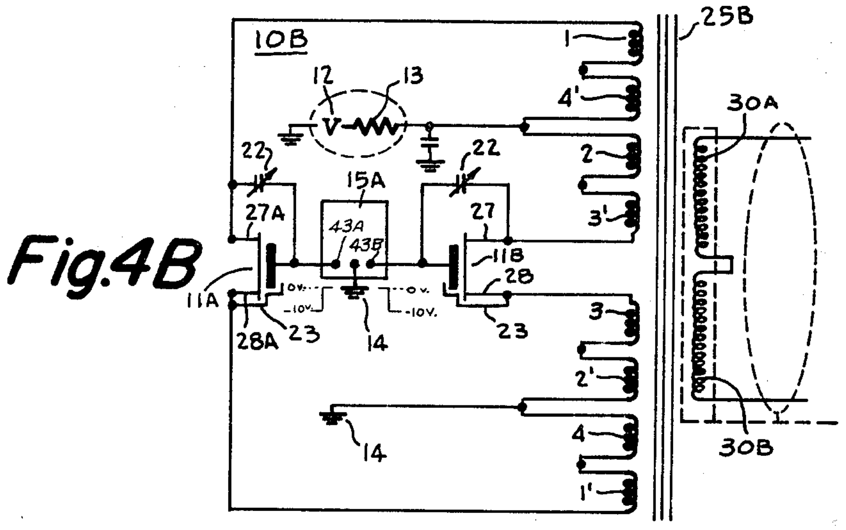

For a more detailed understanding of the invention, reference is made to the following description of various preferred embodiments thereof and to the accompanying drawings in which:

FIG. 1 schematically illustrates a balanced half-wave modulator utilizing a field-effect transistor for periodically shunting a resistance-capacitance coupling circuit;

FIG. 2 schematically illustrates a second balanced half-wave modulator using a field-effect transistor for periodically shunting the primary of a coupling transformer;

FIGS. 3A and 3B schematically illustrate a third balanced half-wave modulator using an insulated-gate field-effect transistor with a coupling transformer having bifilar primary sections;

FIG. 3C is a fragmentary explanatory figure referred to in discussion of the balanced circuitry of other figures;

FIGS. 4A and 4B schematically illustrate a balanced full-wave modulator using a pair of insulated-gate field-effect transistors with a coupling transformer having special disposition and connection of its primary winding sections; and FIG. 5 is a circuit diagram of a pulse generator suited for driving the modulator circuitry of FIGS. 1, 2, 3B and 4B.

In the half-wave modulator 10 shown in FIG. 1, one of the channel-electrodes 27 (i.e., either the source or drain electrode) of the field-effect transistor 11 is connected to one terminal of the external signal source 12, 13 whose other terminal is connected to ground or other circuit-common 14. The resistance 13 exemplifies the effective series-impedance of the source voltage 12 and of any associated filter. Between the circuit-common 14 and the gate or control electrode of transistor 11 is connected a pulse generator 15 effective periodically to switch the transistor to conductive and non-conductive states. The other channel-electrode 28 of the transistor is connected to the circuit-common 14 via the balancing impedance 17 whose value substantially matches the effective source-impedance 13 of the signal source.

The channel-electrodes of transistor 11, which is preferably of the insulated-gate type, are respectively connected via coupling capacitors 19A, 19B to corresponding terminals of substantially equal impedances, exemplified in FIG. 1 by resistors 20A and 20B, having an intermediate terminal connected to the circuit-common 14. These impedances and capacitors provide a coupling network between the shunt-connected chopper transistor 11 and the differential amplifier 21. All or part of such coupling network including the modulator load-impedances 20A, 20B may be physically included in amplifier 21 if the amplifier is made as a unit separate from the chopper 10. It is to be noted that in the shunt-connected modulator of FIG. 1, the source-impedance 13 is a shunt component of the total impedance from channel-electrode 27 to the circuit-common 14 and the balancing-impedance 17 is a shunt-component of the total impedance from channel-electrode 28 and the circuit-common 14.

When transistor 11 is switched to the OFF state, the modulator output voltage as applied to the coupling network should rise to a value corresponding with that of the then existing input signal from source 12. When transistor 11 is switched to the ON state, the modulator output voltage as appearing across the differential coupling network should become of minimum value for the then existing level of the input signal. However, the leading and trailing edges of the chopper drive pulses produced by generator 15, because of flow of current through the internal capacitances of the transistor between its gate and channel-electrodes, are effective to produce high-level spikes in the output pulses of the modulator. The switching transients may have peak values of the order of a millivolt whereas the level of the input signals may be a microvolt or less. With these feed-through capacitances effectively balanced by means including the small external capacitor 22, the voltage drops across impedances 13 and 17 are equal and in the same direction for the leading and trailing edges of the switching pulses. The differential amplifier 21, with its high common-mode rejection capability, effectively rejects these equalized voltage spikes or switching transients so that the AC signal output of amplifier 21 is accurately representative of the magnitude of the low-level signal input of the modulator.

To adopt the half-wave circuit modulator 10 of FIG. 1 for use with a single-ended amplifier 21A, the amplifier coupling network 19A, 19B, 20A, 20B is replaced by a coupling transformer 25 (FIG. 2). This transformer has a split primary winding whose tap is connected to the circuit-common 14 and whose end terminals are respectively connected to the channel-electrodes of transistor 11. The secondary winding 30 of transformer 25 applies the AC or bidirectional pulse output of the modulator 10 either to a single-ended amplifier 21A (FIG. 2) or to the dual input of a differential amplifier 21 (FIG. 1).

For good suppression of the chopper spikes, the halves 26A, 26B of the primary winding of transformer 25 should have an impedance balance within 0.1%. When a simple bifilar winding is used, a coil-start end and a coil-finish end are excited by the switching pulses through the feed-through capacitances. For complete suppression, the coupling circuit, both as viewed from the coil-start end and the coil-finish end, should look identical to the chopper drive circuit. For the simple bifilar winding, this similarity is not normally close but can be improved by enclosing the primary winding in an electrostatic shield which is connected to the circuit-common 14; such shield should not form a closed loop about the core. A better balance of the primary winding is obtainable with the construction schematically shown in FIG. 3A and now described.

One pair of primary coils 1, 2 is wound as a bifilar wind on one bobbin and a second pair of primary coils 1', 2' is similarly wound over a second bobbin. In assembling on a leg of the transformer core, one bobbin is flipped over to bring the start-ends of the coils adjacent one another or to bring the finish-ends of the coils adjacent one another. Assuming the former case (FIG. 3A), the start-end of coil 1 on the first bobbin is connected to the now reversely-oriented start-end of coil 1' on the second bobbin; and the start-end of coil 2 on the first bobbin is connected to the reversely-oriented start-end of coil 2' on the second bobbin (FIG. 3A). The coils 1, 1' so connected (FIG. 3B) form one-half of the transformer primary and coils 2, 2' so connected form the other half-primary winding. Such winding, assembly and connection techniques provide excellent symmetry of the windings with respect to the core, the shields and the case of transformer 25A. The finish-end of one coil of each half-primary is connected to the circuit-common 14 so far as the modulator-frequency is concerned. Specifically, as in FIG. 3A, the finish-end of coil 2 of the lower primary half-winding is connected directly to the circuit-common 14, and the finish-end of coil 1' of the upper primary half-winding is connected to circuit-common 14 via the bypass capacitor 31 which is of low impedance at the modulator-frequency. The finish ends of the other coils 1 and 2' of the primary half-windings are respectively connected to he channel-electrodes of the field-effect transistor 11. Such connections afford excellent circuit symmetry with or without electrostatic shields for the primary windings; the capacitance from any point on one-half primary winding to the core or ground point is matched by the capacitance from the corresponding point on the other half-primary.

For hum-bucking, the two bifilar coils 1, 2 and 1', 2' are disposed on opposite legs of the transformer, as are also two halves of the now-split secondary winding.

In the series-connected chopper circuitry shown in FIG. 3B, the signal source 12, 13 is connected between the two halves of the primary winding in series with the internal channel between the drain and source electrodes of insulated-gate transistor 11. One terminal of the signal source is connected to the circuit-common or ground 14 for both DC and AC: the other terminal of the signal source is isolated from ground, so far as DC is concerned, but for the modulating-frequency is connected to ground by the bypass capacitor 31. By way of example, the capacitance of capacitor 31 may be about 22 $\mu$fs. for a 200-c.p.s. chopper-frequency, and correspondingly lower for higher chopper-frequencies. In absence of capacitor 31, the source-impedance 13 would be in series with the load-impedance (1, 1') between channel-electrode 27 and the circuit-common 14, and thus would form a series-component of the total impedance between points 27, 14. Substantially to balance the total impedance between these points with the total impedance between points 28, 14, the balancing capacitor 31 is connected across the signal source to bypass the chopper-frequency. As an alternative to use of capacitor 31, a balancing-impedance 17 may be connected in series with the load-impedance (2, 2') between the circuit-common 14 and channel-electrode 28 (FIG. 3C). In both cases, the total impedance from electrode 28 to point 14 is made substantially equal to the total impedance from electrode 27 to reference point 14.

In either case and in the other modifications, a small capacitor 22 is provided, externally of transistor 11 between its gate and one of its channel electrodes for balancing of the capacitance between its gate and the case or cover 23 connected to its other channel-electrode. By way of example, the capacitance of capacitor 22 should be about 2 $\mu\mu$fs. for insulated-gate, field-effect transistors of the 2N3631 type.

Instead of bifilar windings, as above described, a diferent type of coupling transformer construction better suited for balanced full-wave modulators using field-effect transistors is shown in FIG. 4A and now described.

On each of a pair of opposite legs of the core of transformer 25B are five coils, two of which are within a corresponding secondary coil (30A or 30B), and the other two of which are outside such coil. All coils on each leg are wound in the same direction with the starting-ends of all coils at the same end of the coil assembly, and with all finish-ends at the opposite end of the coil assembly. Specifically and considering only the primary coils, the start-ends of coils 1, 2, 3 and 4 on the left leg of the core are respectively connected to the start-ends of coils 4', 3', 2' and 1' respectively on the other leg of the core. With the finish-ends of the coils connected as in FIG. 4B, the split primary winding excited by the source signal, when transistor 11A is switched ON, comprises the coils 1, 4', forming one primary half, and coils 1', 4 forming the other primary half; and the split primary winding excited by said signal, when transistor 11B is switched ON, comprises the coils 2, 3', forming one primary half, and coils 2', 3 forming the other primary half. With the two coils of each primary half on opposite legs of the core and with the corresponding coil of each half similarly disposed with respect to the core, the capacitance from any point on one-half of the primary to the core and/or to the electrostatic shielding for the secondary winding is matched by the capacitance from the corresponding point of the other primary half to the core and/or to the secondary shielding. Also, the magnetic pickup from any external field by any coil, or pair of coils, is bucked out by the pickup from the same field by the opposite coil, or pair of coils. The interleaved-sectionalized type of winding shown in FIG. 4A may, of course, be used, instead of bifilar winding, in a half-wave balance chopper.

In the full-wave modulator 10B of FIG. 4B, the pulse generator 15A must, of course, provide a push-pull drive so that each of the insulated-gate field-effect transistors 11A, 11B is alternately switched to the ON state concurrently with switching or the other of them to the OFF state. The switching transients or spikes otherwise occurring in each half-wave of the full-wave pulse output of the modulator 10B are suppressed by the balanced circuitry including, for each of transistors 11A, 11B, the balancing capacitor 22 connected between its insulated-gate electrode and the associated channel-electrode. The pair of transistors 11A, 11B may comprise an integrated-circuit device or unit.

Suitable circuitry for pulse generator 15A of FIG. 4B is shown in FIG. 5 and is now briefly described. The circuit is essentially a free-running multivibrator using a pair of junction transistors 35A, 35B, each having its base coupled by a feedback capacitor 36 to the collector circuit of the other transistor. The collectors of transistors 35A, 35B respectively are connected via load resistors 37A, 37B to one terminal of the DC supply, exemplified by battery 38. The emitters of both transistors 35A, 35B are connected to the circuit-common 14. The bases of transistors 35A, 35B are connected to their associated collectors by resistors 39A, 39B. The clipper diodes 40A, 40B limit the extent to which the base of each transistor is reversely driven by the feed back from the other transistor. The differentiating networks 41A, 41B in the feedback loops of the mutlivibrator sharpen the leading edges of the output pulses appearing at the collectors of the transistors. To provide the drive for a full-wave modulator, such as shown in FIG. 5, the collectors of transistors 35A, 35B are respectively connected to the output terminals 43A, 43B via the blocking capacitors 44A, 44B so to provide output pulses which are in 180° phase relation. The two networks, each comprising resistor 45, diode 46 and Zener diode 47, are connected between the circuit-common and one or the other of the output terminals 43A, 43B and are for the purpose of providing chopper-drive signals which are of desired level and polarity.

When the multivibrator is to be used as the driver 15 of a half-wave modulator unit, such as schematically shown in FIGS. 1, 2 and 3B, one or the other of these networks (45, 46, 47) and the associated coupling capacitor (44A or 44B) may, of course, be omitted for economy reasons.

It shall be understood the invention is not limited to the specific arrangements described, but also comprehends modifications and equivalents within the scope of the appended claims.

What is claimed is:

1. A low-level modulator for interposition between a signal source and an AC amplifier comprising amplifier-coupling means providing a pair of substantially equal impedances each from one of a pair of input terminals of said amplifier-coupling means to a common terminal of said amplifier-coupling means, a solid-state electric-field device having a control electrode and an associated pair of channel-electrodes, said channel-electrodes being respectively connected to said input terminals of said amplifier-coupling means and having internal feed-through capacitance to said control electrode, periodically-operated switching means connected between said control electrode and said common terminal of said amplifier-coupling means repeatedly to switch the channel of said electric-field device alternately to conductive and non-conductive states, and means for minimizing transfer to said AC amplifier of switching transients including an external capacitance connected between said control electrode and one of said channel-electrodes for balancing of the feed-through capacitances from said control electrode to said input terminals of the amplifier-coupling means.

2. A low-level modulator as in claim 1 in which the impedance of said signal source is a shunt component of the total impedance from one of said input terminals of the amplifier-coupling means to said common terminal of the amplifier-coupling means and in which the last-named means additionally includes a balancing-impedance connected between the other of said input terminals of the amplifier-coupling means and said common terminal of the amplifier-coupling means.

3. A low-level modulator for interposition between a signal source and an AC amplifier comprising amplifier-coupling means providing a pair of substantially equal impedances each from one of a pair of input terminals of said amplifier-coupling means to a common terminal of said amplifier-coupling means, a solid-state electric-field device having a control electrode and an associated pair of channel-electrodes, said channel-electrodes being respectively connected to said input terminals of said amplifier-coupling means and having internal feed-through capacitances to said control electrode.

periodically-operated switching means connected between said control electrode and said common terminal of the amplifier-coupling means repeatedly to switch the channel of said electric-field device alternately to conductive and non-conductive states, and means for minimizing transfer to said AC amplifier of switching transients including an external capacitance connected between said control electrode and one of said channel-electrodes for balancing of the feed-through capacitances from said control electrode to said input-terminals of the amplifier-coupling means, the impedance of said signal source being a series-component of the total impedance from one of said input terminals of the amplifier-coupling means to said common terminal of the amplifier-coupling means, the last-named means additionally including capacitance means shunting said signal source to effect substantial balance against the total impedance from the other of said input terminals of said amplifier-coupling means to said common terminal of the amplifier-coupling means.

4. A low-level modulator for interposition between a signal source and an AC amplifier comprising amplifier-coupling means providing a pair of substantially equal impedances each from one of a pair of input terminals of said amplifier-coupling means to a common terminal of said amplifier-coupling means, a solid-state electric-field device having a control-electrode and an associated pair of channel-electrodes, said channel-electrodes being respectively connected to said input terminals of said amplifier-coupling means and having internal feed-through capacitances to said control electrode, periodically-operated switching means connected between said control electrode and said common terminal of the amplifier-coupling means repeatedly to switch the channel of said electric-field device alternately to conductive and non-conductive states, and means for minimizing transfer to said AC amplifier of switching transients including an external capacitance connected between said control electrode and one of said channel-electrodes for balancing of the feed-through capacitances from said control electrode to said input terminals of the amplifier-coupling means, the impedance of said signal source being a series-component of the total impedance from one of said input terminals of the amplifier-coupling means to said common terminal of the amplifier-coupling means, the last-named means additionally including a balancing-impedance as a series-component of the total impedance from the other of said input terminals of the amplifier-coupling means to said common terminal of the amplifier-coupling means.

5. A low-level modulator for interposition between a signal source and an AC amplifier comprising amplifier-coupling means providing a pair of substantially equal impedances each from one of a pair of input terminals of said amplifier-coupling means to a common terminal of said amplifier-coupling means, a solid-state electric-field device having a control-electrode and an associated pair of channel-electrodes, said channel-electrodes being respectively connected to said input terminals of said amplifier-coupling means and having internal feed-through capacitances to said control electrode, periodically-operated switching means connected between said control electrode and said common terminal of the amplifier-coupling means repeatedly to switch the channel of said electric-field device alternately to conductive and non-conductive states, and means for minimizing transfer to said AC amplifier of switching transients including an external capacitance connected between said control electrode and one of said channel-electrodes for balancing of the feed-through capacitances from said control electrode to said input terminals of the amplifier-coupling means, said amplifier-coupling means comprising center-tapped impedance means whose center-tap provides said common terminal of the amplifier-coupling means and whose end terminals are respectively connected by low-impedance capacitors to said channel-electrodes, the impedance of said signal source being a shunt component of the total impedance from one of said input terminals of the amplifier-coupling means to said common terminal of the amplifier-coupling means, the last-named means additionally including a balancing-impedance substantially matching the signal source impedance in value and connected as a shunt component of the total impedance from the other of said input terminals of the amplifier-coupling means to said common terminal of the amplifier-coupling means.

6. A low-level modulator for interposition between a signal source and an AC amplifier comprising amplifier-coupling means providing a pair of substantially equal impedances each from one of a pair of input terminals of said amplifier-coupling means to a common terminal of said amplifier-coupling means, a solid-state electric-field device having a control electrode and an associated pair of channel-electrodes, said channel-electrodes being respectively connected to said input terminals of said amplifier-coupling means and having internal feed-through capacitances to said control electrode, periodically-operated switching means connected between said control electrode and said common terminal of the amplifier-coupling means repeatedly to switch the channel of said electric-field device alternately to conductive and non-conductive states, and means for minimizing transfer to said AC amplifier of switching transients including an external capacitance connected between said control electrode and one of said channel-electrodes for balancing of the feed-through capacitances from said control electrode to said input terminals of the amplifier-coupling means, said amplifier-coupling means comprising a transformer having a center-tapped primary winding whose center-tap provides said common terminal of the amplifier-coupling means and whose end terminals provide said pair of input terminals of the amplifier-coupling means, the impedance of said signal source being a series-component of the total impedance from one of said channel-electrodes to said common terminal of the amplifier-coupling means, the last-named means additionally including a balancing-impedance substantially matching the signal source impedance in value and connected as a series-component of the total impedance from the other of said channel-electrodes to said common terminal of the amplifier-coupling means.

7. A low-level modulator for interposition between a signal source and an AC amplifier comprising amplifier-coupling means providing a pair of substantially equal impedances each from one of a pair of input terminals of said amplifier-coupling means to a common terminal of said amplifier-coupling means, a solid-state electric-field device having a control-electrode and an associated pair of channel-electrodes, said channel-electrodes being respectively connected to said input terminals of said amplifier-coupling means and having internal feed-through capacitances to said control electrode, periodically-operated switching means connected between said control electrode and said common terminal of the amplifier-coupling means repeatedly to switch the channel of said electric-field device alternately to conductive and non-conductive states, and means for minimizing transfer to said AC amplifier of switching transients including an external capacitance connected between said control electrode and one of said channel electrodes for balancing of the feed-through capacitances from said control electrode to said input terminals of the amplifier-coupling means, said amplifier-coupling means comprising a transformer having a split primary winding, one half of said winding being connected in series with said signal source between said common terminal of the amplifier-coupling means and one of the channel-electrodes and the other half of said winding being connected between the other of said channel-electrodes and said common terminal of the amplifier-coupling means, the last-named means additionally including capacitance means of low impedance at the operating frequency of said switching means and connected in shunt to said signal source.

8. A low-level modulator as in claim 7 in which each half of the primary winding consists of two coils each wound on separate bobbins on which are also wound in bifilar fashion the two coils connected to form the other half of the primary winding.

9. A low-level modulator as in claim 7 in which for a full-wave modulator, the transformer has two primary windings, each split with its two halves connected as in claim 7, to an associated one of two field-effect devices concurrently switched to opposite states by said switching means, and in which each half of each primary winding comprises two coils disposed on different legs of the transformer core and having the same disposition and stray capacitance as the two coils forming the other half primary.

References Cited

UNITED STATES PATENTS

| | | | |
|---|---|---|---|
| 3,034,074 | 5/1962 | Perkins | 332—52 |
| 3,201,689 | 8/1965 | Knick | 321—45 XR |
| 3,202,922 | 8/1965 | De Schamphelaere | 330—9 |
| 3,229,190 | 1/1966 | Morrison et al. | 321—45 |
| 3,281,718 | 10/1966 | Weberg | 307—88.5 |
| 3,287,620 | 11/1966 | Tuszynski | 321—8 XR |
| 3,309,527 | 3/1967 | Walker | 330—9 XR |

FOREIGN PATENTS

| | | |
|---|---|---|
| 1,016,975 | 1/1966 | Great Britain. |

LEE T. HIX, *Primary Examiner.*

W. M. SHOOP, *Assistant Examiner.*